(12) United States Patent
Bohler et al.

(10) Patent No.: US 7,019,620 B2
(45) Date of Patent: Mar. 28, 2006

(54) DEVICE FOR THE INDUCTIVE TRANSMISSION OF ELECTRICAL POWER

(75) Inventors: Frank Bohler, Grenzach-Wyhlen (DE); Roland Winterhalter, Breisach (DE); Mathias Wechlin, Kandern (DE); Rudolf Mecke, Magdeburg (DE)

(73) Assignee: Wampfler Aktiengesellschaft, Weil am Rhein-Maerkit (DE)

( * ) Notice: Subject to any disclaimer, the term of this patent is extended or adjusted under 35 U.S.C. 154(b) by 120 days.

(21) Appl. No.: 10/480,812

(22) PCT Filed: Jun. 19, 2002

(86) PCT No.: PCT/EP02/06765

§ 371 (c)(1),
(2), (4) Date: Dec. 15, 2003

(87) PCT Pub. No.: WO03/005380

PCT Pub. Date: Jan. 16, 2003

(65) Prior Publication Data

US 2004/0183640 A1    Sep. 23, 2004

(30) Foreign Application Priority Data

Jul. 4, 2001 (DE) ............................... 101 31 905

(51) Int. Cl.
*G05B 11/01* (2006.01)
(52) U.S. Cl. .................. 340/310.17; 336/182
(58) Field of Classification Search ........... 340/310.07, 340/310.01, 310.17, 310.11; 336/180, 182, 336/183
See application file for complete search history.

(56) References Cited

U.S. PATENT DOCUMENTS 3,820,106 A * 6/1974 Yamashita et al. ..... 340/310.07
5,293,308 A * 3/1994 Boys et al. ................. 336/178

5,936,946 A    8/1999    Hoffmann (Continued)

FOREIGN PATENT DOCUMENTS

DE    749653    11/1944

(Continued)

*Primary Examiner*—Thomas Mullen
(74) *Attorney, Agent, or Firm*—Connolly Bove Lodge & Hutz LLP

(57) ABSTRACT

The invention relates to a device for the inductive transmission of electrical power, comprising a power line which is situated on the primary side of said device and which consists of two wires which are guided in a parallel manner relative to each other. Power can be drawn from line by at least one mobile consumer, which is situated on the secondary side, by means of inductive coupling. Said device is provided with a data line which is situated on the primary side for the additional inductive transmission of data to and/or from the consumer. Said data line consists of two wires which are guided in a parallel manner relative to each other. Each of the data line wires is arranged adjacent to one of the two power line wires and in a manner that is symmetrical to a plane. The cross section of the conductor of the adjacent wire of the energy line is also symmetrical relative to the plane. The inductive coupling between the power line and the data line can be thus kept very low, and simultaneously enables the inductor, which is to be provided on the secondary side for the magnetic coupling with the data line, to be integrated into or mounted on the energy-transmitting consumer. The data line can be fixed to the power line or both lines can be integrated therewith in a common cable.

18 Claims, 3 Drawing Sheets

U.S. PATENT DOCUMENTS 6,005,475 A * 12/1999 Takasan et al. ........ 340/310.07

FOREIGN PATENT DOCUMENTS

| DE | 3150380 | 7/1983 |
| DE | 3921786 | 1/1991 |
| DE | 4218707 | 4/1993 |
| DE | 4244202 | 6/1994 |
| DE | 19538528 | 4/1997 |
| DE | 19649682 | 6/1998 |
| DE | 10147859 | 4/2003 |
| WO | WO-03/005380 | 1/2003 |

* cited by examiner

Fig. 4A                    Fig. 4B

DEVICE FOR THE INDUCTIVE TRANSMISSION OF ELECTRICAL POWER

CROSS REFERENCE TO RELATED APPLICATIONS

This application is a U.S. National Stage entry of co-pending International Patent Application No. PCT/EP02/06765, filed on Jun. 19, 2003 by BÖHLER, Frank et al. entitled DEVICE FOR THE INDUCTIVE TRANSMISSION OF ELECTRICAL POWER, the entire contents of which is imcorporated by reference, and for which priority is claimed under 35 U.S.C. § 371. As in the parent International Application No. PCT/EP02/06765, priority is also claimed to co-pending Germany Patent Application No. 101 31 905.3, filed on Jul. 4, 2001, the entire contents of which is incorporated by reference for which priority is claimed under 35 U.S.C. § 119.

BACKGROUND OF THE INVENTION

The invention relates to a device for inductive transmission of electric power.

A similar device, which is known for example from WO 92/17929, serves for transmission of electrical power to at least one mobile pick-up without a mechanical or electrical contact. It comprises a primary and a secondary part, which are electromagnetically coupled similarly to the transformer principle. The primary part consists of input electronics and a conductor loop deployed along a path. One or more pick-ups and the associated electronic components of the pick-up form a secondary part. In contrast to a transformer, when a primary and a secondary part are coupled together as closely as possible, a loosely coupled system is created. This system can be realized with a relatively high operating frequency in the kiloherz range, which makes it possible to create a bridge even between large air gaps of up to several centimeters. In this case, the operating frequency is determined on the secondary side as a resonance frequency, which is formed with a parallel connection of a condenser to a pick-up coil.

Among the advantages of this type of power transmission are in particular freedom from the wear and tear maintenance, as well as the safety of the contact and a degree of availability. Typical applications are in the area of material transport systems for the manufacturing technology, but also for personal transport systems such as elevators and electrically driven buses. Many of these applications require a connection for communication between a central control station and the mobile pick-up, in particular for controlling the pick-up with remote control. Moreover, in a system that has a plurality of pick-ups it can be also desirable for the pick-ups to be able to communicate with each other, for instance in order to coordinate independently their movements and to prevent collisions. Based on the existing state of art, similar communication is normally achieved in the form of radio communication.

BRIEF SUMMARY OF THE INVENTION

The basic task of the present invention is to indicate a new way for transfer of information to a mobile pick-up and to provide a cable that is suitable for this purpose with a device for inductive transmission of electrical power.

This task is solved with a device having the characteristics of the claimed invention.

The invention utilizes the fact that the principle of inductive coupling is readily applicable not only to power transmission, but also to data transmission, and that with the laying of a primary conductive loop, the laying of a data line deployed in parallel thereto involves only a very small additional expenditure. This concept, however, results in the problem that the data line must be inductively coupled sufficiently closely to the mobile pick-up with its associated reception and/or transmission direction, while at the same time, it must be decoupled as far as possible from the power line. The invention solves this problem with a special, geometrical arrangement of the data line relative to the power line.

It is particularly advantageous to utilize a cable that has been specifically optimized for a combination of a data line with a power line in accordance with this invention, wherein the expenditure required for the joint laying of both lines as well as the risk of a faulty laying is greatly reduced. A further advantage of such a cable, in which both lines have been integrated, is a higher resistance to bending when compared to two separate cables, while fewer attachment points will be required with a hanging arrangement in order to maintain a prescribed maximum length.

BRIEF DESCRIPTION OF THE DRAWINGS

The following is a description of embodiments of the invention based on the figures. The figures indicate the following.

DETAILED DESCRIPTION OF THE INVENTION

Figure 1:
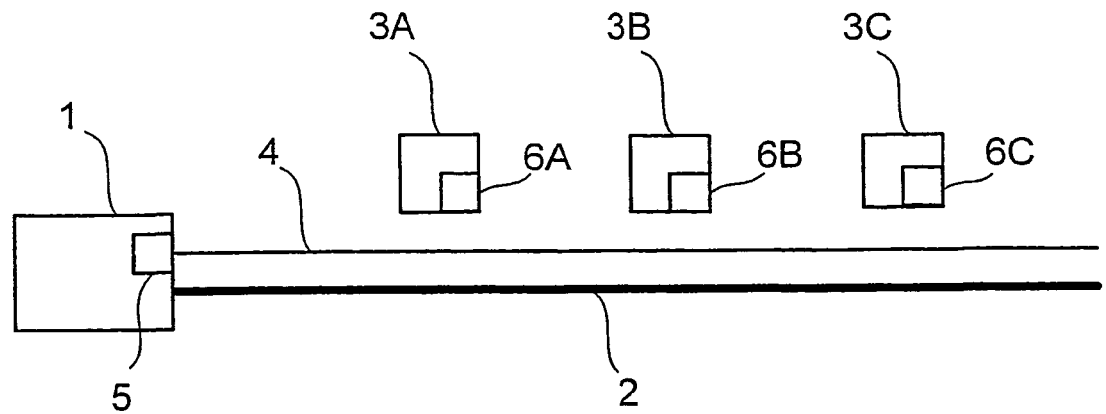
FIG. 1 is a schematic, lengthwise view of a device according to the invention.

As shown schematically in FIG. 1, a system for inductive transmission of electrical power comprises power supply electronics 1, and a power line 2, as well as one or a plurality of mobile pick-ups 3A through 3C, while 3 pick-ups represented by pick-ups 3A through 3C are employed in FIG. 1 for purely illustrative purposes. The power supply electronics 1 furnish alternating current to the power line 2, which is formed as a loop, while each respective pick-ups 3A through 3C is inductively coupled thereto. Each pick-up 3A through 3C represents at the same time a constituent part of a mobile user along the power line 2 because the pick-up is provided with alternating voltage thanks to said inductive coupling. This voltage can be converted depending on the need of pick-up. It is thus possible for example to produce direct voltage in this location by means of a rectifier and a switch controller of a known art.

In accordance with the invention, a data line 4 runs parallel to the power line 2, which is connected via the supply electronics 1 directly to a combined transmission and reception device 5, hereinafter referred to as a transceiver. On the side of each pick-up 3A through 3C are also provided transceivers 6A through 6C, while each of them is inductively coupled with the data line 4. Information is transmitted between the transceiver 5 and the transceivers 6A through 6C serially, for instance in the form of control commands that are sent to each mobile user, as well as status reports that are sent by individual users. It goes without saying that in principle, a pure sender on one side can be also combined with one or several pure receivers on the other side, provided that bidirectional communication is not of interest. On the other hand, bidirectional transceivers 6A through 6C can communicate not only with the stationary transceiver 5, but also with each other. Finally, the data line 4 provides a transmission medium for a serial data bus, through which any complex data can be transmitted based on a suitable protocol from the participants who are connected to it to the stationary transceiver 5, as well as for the mobile transceivers 6A Through 6C.

While the inductive transmission of information signals per se has been known in information technology for a long time, for instance from the application of transmitters to resistance transformation or to potential separation, the special feature of the present invention is based on the fact that the primary and secondary sides are not stationary relative to each other, but instead mobile along a long route, and that the transmission of information is achieved also through the inductive power transmission over an almost equal distance.

With a parallel deployment of both lines 2 and 4, based on the fact that a significantly larger magnetic current density is required for power transmission in a determined field than what is required for transmission of information, one has to take into account first of all the crosstalk from the power line 2 to the data line 4, that is to say interference with the transmitted information signal. In order to suppress this interference as much as possible, the geometrical arrangement illustrated by the cross-sectional view shown in FIG. 2 is provided by the present invention for the individual wires 2A and 2B or 4A and 4B.

Lines 2 and 4 are deployed in the form of a loop. In this manner, the supplied current flows at any time to the line 2 on the primary side for power transmission, for example in the wire 2A from the supply electronics 1 and back to the other wire 2B or vice versa. In an analog manner, the current will flow either from the transceiver 5 into the current supplied in the line 4 or from one of the transceivers 6A through 6C into the current induced in the line 4 at any time, for example in the wire 4A in the direction away from the transceiver 5 and in the other wire 4B to the transceiver 5 or vice versa. Topologically, this means that the respective wires 2A and 2B on the one hand and the wires 4A and 4B on the other hand pass over each other in the form of a loop, or are connected with each other in a conductive manner by means of a terminal member. Each of both wires 2A and 2B of the power line 2, comprises, as shown in FIG. 2 on the wire 2B, a metallic conductor 7, which is surrounded by insulation 8.

Figure 2:
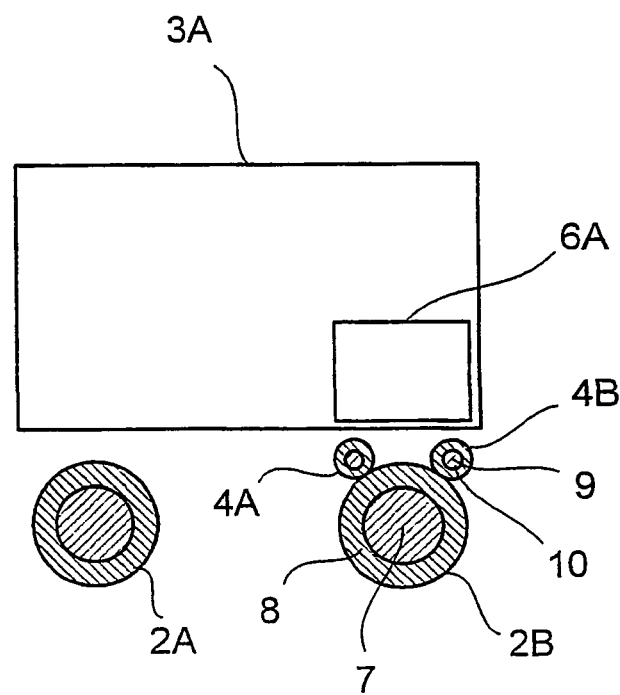
FIG. 2 is a schematic, cross-sectional view of a first embodiment form of the device according to FIG. 1.

Analogously, each of both wires 4A and 4B of the data line 4 comprises, as shown on the wire 4B in FIG. 2, a metallic conductor 9 that is surrounded by insulation 10.

In order to keep the interference with the information transfer due to the energy transfer as small as possible, the mutual inductance between both lines 2 and 4 must be maintained as small as possible. This means that the magnetic current produced by the current in the power line 2 should be interlinked as little as possible with the data line 4, that is to say the level of the connection between both wires 4A and 4B should create as little permeation as possible. For the portion of the total current that originates from the current in the wire 2B, this is achieved in an ideal manner with the arrangement according to FIG. 2, because the field of a rectilinear current in the cross-sectional plane is developed, as is generally known, tangentially, and the lines of the flux of the current in the wire 2B, creating a radially symmetrical distribution of the current, which can be presumed here without further complications, are in the form of concentric circles about the center axle of the wire 2b, so that the resulting magnetic flux component will be zero due to the level of the connection between the wires 4A and 4B. This is achieved by the symmetrical arrangement of both wires 4A 4B with respect to the wire 2B.

Although the resulting field of the other wire 2A, whose magnetic flux lines form concentric circles about the center axis of the wire 2A, creates a non-fading flux component through the connection level of the wires 4A and 4B, this component is significantly less important because the wire 2A is further away than the wire 2B. It is clear that the smaller this flux component, the further away the location of the wires 4A and 4B from the wire 2A, and the closer the location of the wire 4A to the wire 4B. A reduction of said flux component with a further increase of the distance from the wire 2A, however, creates a conflict because the line 4 will then no longer be deployed together with the line 2 in a joint channel, and also it will no longer be possible to integrate transceiver 6A together with the pick-up 3A in one structural unit as indicated in FIG. 2. Finally, the same is also applicable to rotation of both wires 4A and 4B by 90 degrees in the clockwise direction about the center axis of the wire 2B, which would be optimal in view of the minimization of the interlinking with the flux generated by the wire 2A. A separately deployed data line 4 and/or an arrangement of the transceiver 6A that is completely separate front the pick-up 3A would lead to significantly higher system costs. This is contrasted with a reduction of said flux component through a further decrease of the mutual distance between the wires 4A and 4B, since this would necessarily also decrease the magnetic coupling between the wire 4 and the transceiver 6A.

The symmetrical arrangement of the data line 4 with respect to one of the wires 2B in the immediate vicinity thereof thus represents a compromise with respect to suppression of the crosstalk between the power line 2 and the data line 4, while in order to maximize the magnetic coupling between the data line 4 and the transceiver 6A, it is effective to select from all arrangements those that are equivalent with respect to the symmetry between the data line 4 and the neighboring wire 2B of the power line 2, wherein the data line 4 is located as close as possible to the transceiver 6A. It goes without saying that with the integration of the transceiver 6A in the pick-up 3A, as shown in FIG. 2, the transceiver 6A on the secondary side should be arranged as close as possible to the wire 2B and thus also to the data line 4.

As an alternative to the arrangement illustrated by FIG. 2, both conductors of the data line 4 can be also arranged in such a way so that the same type of symmetry in the adjacent wire 2B will also be displayed with respect to the distant wire 2A of the power line 2. In this respect, FIG. 3 indicates the above mentioned arrangement as an example, wherein both wires 4A and 4B of the data line 4 are rotated in contrast to the arrangement according to FIG. 2 with respect to the center axis of the adjacent wire 2B of the power line 2 by 90 degrees in the clockwise direction. Also in this case, no additional interlinking of the data line 4 will be created with the magnetic flux produced by the distant wire 2A, so that theoretically, no inductive crosstalk of any type occurs.

Figure 3:
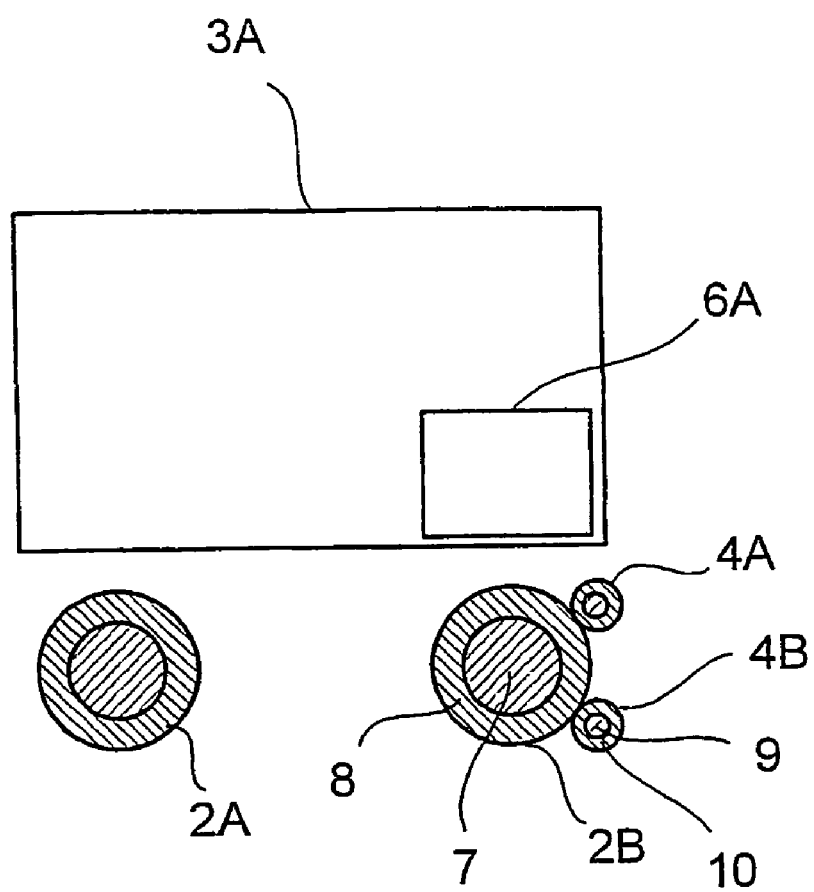
FIG. 3 is a schematic, cross-sectional view of another embodiment form of the device according to FIG. 1, and FIG. 4 A-C is a schematic, cross-sectional view of a different embodiment of a special cable according to this invention.

It goes without saying that the position of the transceiver 6A indicated in FIG. 3, which is identical to the one shown in FIG. 2, is not optimal. Assuming that the direction of the transceiver 6A that is illustrated by FIG. 2 is vertical to the level defined by the center axis of both wires 4A and 4B of the data line 4 for maximum sensitivity, which will mean an optimal orientation of the transceiver 6A in FIG. 2, then an equally rotated arrangement of the transceiver 6A to the right adjacent to the wires 4A and 4B would be optimal with the arrangement of the data line 4 that is rotated by 90 degrees in FIG. 3. However, this location will be generally unavailable given how difficult it would be to realize branching of the power line 2, so that the transceiver 6A must be arranged above the power line 2 also in the embodiment according to FIG. 3. This results in a lateral position of the transceiver 6A, as a compromise between the inductive coupling on the one hand, and the space that is available for integration into or addition to the customer 3A on the other hand.

In addition, the transmission and reception coil of the transceiver 6A can be also built into its own housing inside the same transceiver diagonally to the outer walls and the direction can thus be varied for maximum sensitivity without rotating the busing. This provides an additional amount of freedom for the accommodation of the transceiver 6A placed above the power line 2 with a lateral arrangement of the data cable according to FIG. 3.

The invention, however, is in no way limited to the profile forms of the lines 2 and 4 illustrated by the figures. For example, the wires 2A and 2B of the power line 2 can also employ a rectangular profile, which would depend on a rectangular form of the conductor 7. In this case, the profile of the conductor 7 would require two symmetrical planes and both wires 4A and 4B of the data line 4 would have to be arranged symmetrically with respect to one of these symmetrical planes in order to eliminate the flux component originating from the current in the wire 2B.

Moreover, the customer 3A can also have a different form. For example, a T-shaped or E-shaped customer can be created, in which case a vertical T-crosspiece would be projecting between both wires 2A and 2B and both outer legs thereof would be laterally encompassed. Analogously to this case, the transceiver 6A can also have a different profile form than the form illustrated in FIG. 2.

Furthermore, the arrangement according to the invention can also employ at the same time a data line 4 for both wires 2A and 2B for power transmission purposes to make available a second data line 4 for the realization of communication with full duplex operations. In this case, a corresponding transceiver 5 or 6A through 6C will be required both on the primary side and on the secondary side for both data lines 4. Communication in full duplex mode, however, would be also made possible with only one data line 4, as illustrated in FIGS. 2 and 3, by separating both transmission directions in the frequency range.

As one can see from FIGS. 2 and 3, the data line 4 can be constructed separately from the power line 2. In order to maintain the defined position of the data line toward the transceiver 6A, it is advantageous when the data line 4 is attached to the wire 2B of the power line 2. This could be achieved for example with gluing or with a common cable binder. A substantially advantageous type of attachment from the viewpoint of an easy assembly is an arrangement of holding clamps in equal intervals along the lines 2 and 4, wherein the clamps are formed in such a way so that the lines 2 and 4 can be locked by a clamp with a short handle. Both lines 2 and 4 can, however, also be integrated in a joint, special cable, which is by far the easiest method for the laying of the cable.

Figure 4C:
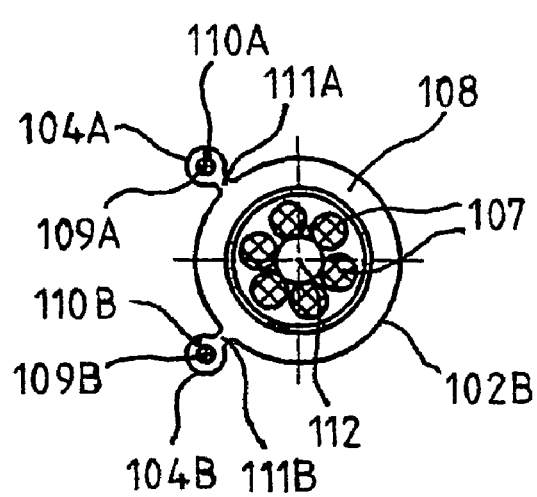

FIGS. 4A through 4C show three possible variants of such a special cable in profile. In the variant according to FIG. 4A, the circular insulations 110A and 110B of both wires 104A and 104B, which together form the data line 4, are connected through bridges 111A or 111B in one piece with the circular insulation 108 of the wire 102B of the power line 2. The complete insulation consisting of the parts 108, 110A and 11B, as well as 111A and 111B, is formed during a single operation stage by extrusion around the conductors 107A, 109A and 109B. Due to the unsymmetrical outer form, the position of the conductor 109A and 109B on the conductor 107 is clearly visible from outside, so that an erroneous orientation during the deployment is largely prevented.

In all the variants shown in FIGS. 4A through 4C, respective conductors 107, 207 and 307 of the power line 2 consist of strands, that is to say of several individual wires insulated from each other, which are wound in a spiral form around a central insulator 112 or 212 or 312, wherein the spiral winding is not visible in the profile shown in FIGS. 4A through 4C. Although the profile of the conductors 107, 207 and 307 is thus not circular, as is schematically illustrated by FIGS. 2 and 3, the current distribution can still be considered as being approximately radially symmetrical. The information regarding the magnetic field in the conductor 7 found in FIGS. 2 and 3 is thus in the same manner also applicable to the conductors 107, 207 and 307 of the cable variants illustrated by FIGS. 4A through 4C. Moreover, it is also advantageous when the use of strands for the power line 2 is dependant on to what extent radial current displacement is displayed with the respective operation parameters (current and frequency).

It is also possible to create a configuration in which no strands are used and in which a conductor with a circular profile as shown in FIGS. 2 and 3 can be employed.

In the variant according to FIG. 4A, the bridges 111A and 111B are relatively thin so that both wires 104A and 104B can be separated with the application of a small force from the wire 102B. This is desirable due to the fact that the beginning of the power line 2 must be connected to supply electronics 1, while onto other hand, the data line must be connected to a transceiver 5 as one can see from FIG. 1. In addition, tuning condensers, not shown in the figure, must be connected to the power line 2 along the course of the power line in order to reset the power line 2 for the operating frequency in resonance predetermined by the supply electronics 1, while the data line 4 does not require any such tuning condensers. It is thus generally advantageous when the data line 4 can be separated from the power line 2 without a large expenditure in order to connect respective other special system components independently of both lines.

The cable variant according to FIG. 4B differs from to one shown in FIG. 4A in that it is provided with a rectangular profile arrangement of joint insulation 213 in one piece of the conductor 207 of the power line 2 and of both conductors 209A and 209B of the data line 4. Both conductors 209A and 209B themselves are arranged in two corners delimiting the side 214 of the insulation 213. Two slits 215A and 215B are created along the cable from said side 214, so that they are extended at right angles to this side adjacent to the conductors 209A and 209B, so that the side 214 can be identified as such from outside. Respective notches 216A and 216B are extended along the cable in a position corresponding to the slits 215A and 215B on both sides of the insulation adjacent to the side 214. Each of these notches defines together with the respective adjacent slit 215A or 215B a predetermined breaking point 211A or 211B, which corresponds to the bridge 111A or 111B according to FIG. 4A, enabling a problem-free separation of the data line 4 from the power line 2.

In contrast to both preceding variants, the third cable variant according to FIG. 4C does not presuppose extrusion of the entire insulation in one piece by means of a special tool. Instead, the power line 2 and the data line 4 are according to this variant constructed separately and they are later connected with each other.

The profile form of the power line 2 corresponds in this case to that of FIG. 4A with a conductor 307 and an associated circular insulation 308. The data line 4 consists of two conductors 309A and 309B, each of which is provided with circular insulation 310A or 310B. The latter components are connected with a bridge 317 so as to create one piece. The mutual distance between the conductors 309A and 309B is largely determined by the bridge 317 and it is constant in particular in the lengthwise direction of the data line 4. The data line 4 is in its construction comparable to a 300σ antenna line that is common according to prior art. It would be essentially also conceivable to use a fiat cable with more than 2 wires for the data line 4, from which only two wires would then be used for data transmission.

Figure 4C:
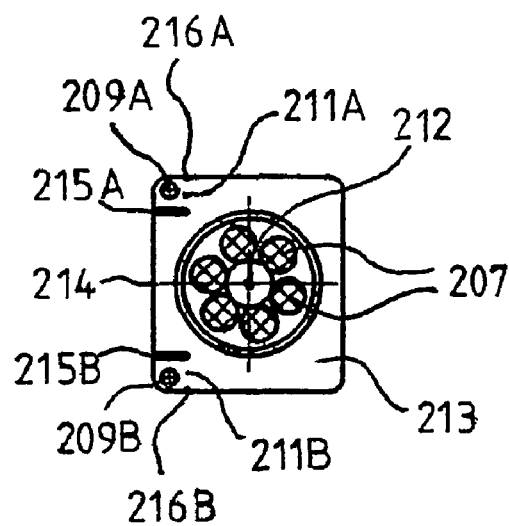
Figure 4C:
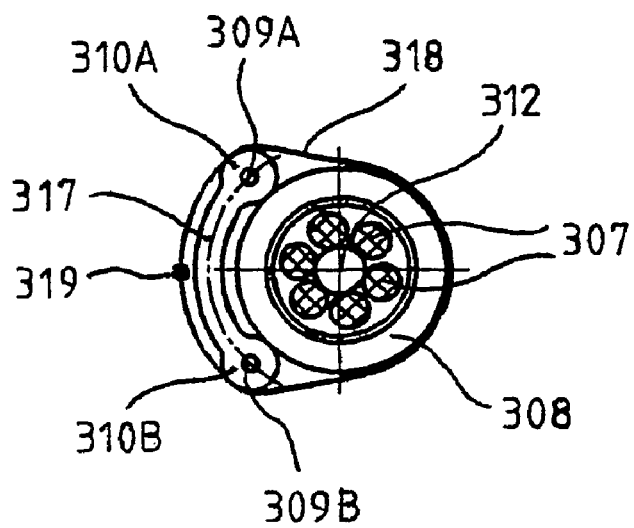

To create a mechanical connection between both lines, the data line 4 is set up against the power line, wherein the bridge 317 should be preferably flexible, so that the data line 4 can be adjusted in its form to the power line 2 as illustrated by FIG. 4. Both lines are then covered by a joint jacket 318, which should be preferably made of a textile or textile-reinforced material. Since in both of these variants, the position of the data line with respect to the power line is not visible as such on the outer form of the cable, this position should be preferably indicated with color coding, for example by a strip 319 deployed in the center of the data line 4, on the outer side of the jacket 318. The variant according to FIG. 4C is in particular advantageous when the total required length of the cable would not justify the expenditure required for extrusion of the insulation in one piece from an economical viewpoint.

To enable a distinction based on the frequency, it is effective when the information signal is in a higher frequency range than the power signal, for example in the range of several Megahertz. A digital modulation procedure of known art can be selected for input of digital information, for example frequency switching (FSK). 10 to 150 kBit/s can be estimated as a rough basis of evaluation for the applicable range of the transmission rate, wherein the carrier frequency must be adjusted in a suitable manner as is generally known. Depending on the application, the length of the transmission route, which corresponds to the length of the range of the movement of the service user, will be variable within a wide range, that is to say from about 1 meter to several hundred meters.

What is claimed is:

1. A device for inductive transmission of electric energy, provided with a primary side power line comprising two wires deployed parallel to each other, wherein the power can be drawn by at least one mobile pick-up on a secondary side by means of inductive coupling along its energy path, wherein a data line, comprising two wires, deployed in parallel to each other on the primary side, is provided for additional inductive transmission of data to or from the pick-up, and wherein both wires of the data line are arranged adjacent to one of the wires of the power line and wherein they are deployed further away from the other wire of the power line, and wherein they are arranged symmetrically to a plane, to which the profile of the conductor of the adjacent wire of the power line is also symmetrical.

2. The device according to claim 1, wherein the data line displays the same type of symmetry with respect to the more distant wire of the power line as with respect to the adjacent wire.

3. The device according to claim 2, wherein—the data line is arranged on the side of the adjacent wire of the power line which is turned away from the other wire.

4. The device according to claim 1, wherein the data line is arranged in the space between the adjacent wire of the power line and the space in which the pick-up is moving on the secondary side.

5. The device according to claim 1, wherein the data line is attached to the power line.

6. The device according to claim 5, wherein the attachment of the data line to the power line is secured with a plurality of connecting members, which are arranged along both lines and locked by these lines.

7. The device according to claim 1, wherein the data line is integrated together with the power line in a joint cable.

8. The device according to claim 1, wherein inductance is provided in or on the secondary side pick-up, which is magnetically coupled with the data line.

9. The device according to claim 8, wherein the inductance that is magnetically coupled with the data line is arranged in such a way in or on the pick-up, so that in the operating position of the pick-up the inductance is maintained in the same type of symmetry as the data line to that wire of the power line to which the data line is adjacent.

10. The device according to claim 8, wherein at least one transmission device and at least one reception device are provided in at least one location along the data line on the primary side or at an end of the same line, and in or on the pick-up on the secondary side, between which information signals can be transmitted through the data line and the inductance is magnetically coupled therewith.

11. The device according to claim 10, wherein combined transmission and reception devices are provided both along the date line and in or on the pick-up, enabling a bidirectional communication through the data line.

12. A device according to claim 1, wherein a data line is deployed adjacent to each of the two wires of the power line.

13. The device according to claim 12, wherein each data line is associated with corresponding transmission and reception devices along the data line and in or on the pick-up, creating together communication in the full duplex mode.

14. A cable for the primary conductor loop of a device for inductive transmission of electrical power at least to one mobile pick-up, having a conductor that is provided with an approximately symmetrical profile and surrounded by insulation, wherein for the purposes of simultaneous transfer of data to and/or from the pick-up, two other conductors having a significantly smaller profile are arranged parallel to the first conductor and symmetrically to plane of symmetry of its profile; and wherein the other conductors are also surrounded by insulation and tightly attached to the first conductor, and wherein the angular position of the two other conductors with respect to the first conductor is visible from outside by the form of the cable and/or by a marking.

15. The cable according to claim 14, wherein the two other conductors can be separated together with their respective insulations from the first conductor without destroying the insulation.

16. The cable according to claim 14, wherein the insulations of the two other conductors are constructed as one piece with the insulation of the first conductor and connected with this insulation by means of predetermined breaking points.

17. The cable according to claim 14, wherein the two other conductors are parts of an insulated flat cables, which is separate from the first conductor and insulation of the first conductor, and which is adjacent to the insulation of the first conductor and held in a fixed position with respect to it by a common jacket.

18. The cable according to claim 17, wherein the common jacket, which is attached additionally, is made from a textile or textile-reinforced product.

* * * * *